US005938579A

United States Patent [19]

Cavazos

[11] Patent Number: 5,938,579
[45] Date of Patent: Aug. 17, 1999

[54] MAGNETIC ROLLER

[76] Inventor: Arnold B. Cavazos, 3214 Hidden Meadows Dr., Newton, Kans. 67114

[21] Appl. No.: 08/895,100

[22] Filed: Jul. 16, 1997

[51] Int. Cl.[6] .......... B23P 15/00

[52] U.S. Cl. .......... 492/8; 492/36; 492/45

[58] Field of Search .......... 492/8, 30, 36, 492/45; 335/303; 355/405, 407; 100/155 R, 917

[56] References Cited

U.S. PATENT DOCUMENTS

| | | | |
|---|---|---|---|
| 3,456,582 | 7/1969 | McClenathan | 492/8 |
| 3,457,618 | 7/1969 | O'Neal et al. | 492/8 |
| 4,266,328 | 5/1981 | Harada et al. | 492/8 |
| 4,376,330 | 3/1983 | Weidinger et al. | 492/8 |
| 4,517,719 | 5/1985 | Okumura et al. | 492/8 |
| 4,640,808 | 2/1987 | Okumura et al. | 492/8 |
| 4,823,102 | 4/1989 | Cherian et al. | 492/8 |
| 5,030,937 | 7/1991 | Loubier et al. | 492/8 |
| 5,384,957 | 1/1995 | Mohri et al. | 492/8 |

*Primary Examiner*—I Cuda
*Attorney, Agent, or Firm*—Kenneth Jack

[57] ABSTRACT

A magnetic roller has a plurality of outwardly opening spacer receiving channels therearound, the roller being composed of a ferromagnetic steel; a plurality of non-magnetic spacers, each such spacer's interior surface forming a magnet receiving channel, each such spacer being composed of a non-magnetic material; a multiplicity of permanent magnets; a multiplicity of pole pieces, each such pole piece being composed of ferromagnetic steel; each non-magnetic spacer being fixedly mounted within a spacer receiving channel; the permanent magnets and pole pieces being fixedly mounted within the magnet receiving channels of the non-magnetic spacers, so that the pole pieces are alternately interspaced between the permanent magnets; and so that the permanent magnets are alternately oriented.

11 Claims, 5 Drawing Sheets

MAGNETIC ROLLER

FIELD OF THE INVENTION

The instant invention relates to rollers having permanent magnets disposed over or embedded within their exterior radial surfaces, the magnets functioning to securely affix ferromagnetic materials such as sheet steel to the exterior radial surface of the roller.

BACKGROUND OF THE INVENTION

Modern printing and die cutting processes commonly include the step preparing a printing or die cutting plate through acid etching of the plate. In preparation of a printing plate, an image of text or graphics is acid etched into a photopolymer layer disposed over a rectangular piece of flexible sheet steel. In preparation of a die cutting plate, acid directly etches away the plate material, leaving cutting ridges in desired locations. Sheet steel is a preferred die cutting plate material because it is durable, is easily etched, and is ferromagnetic. Sheet steel is a preferred photopolymer printing plate substrate material because it is durable and is ferromagnetic. Such plates commonly are wrapped around and fixedly attached to the exterior radial surface of the print or die cutting roller of a roller press. commonly, the means for attaching such plates to such rollers is a multiplicity of magnets embedded within the exterior radial surface of the roller.

In order to achieve a secure magnetic bond between a flexible steel printing or die cutting plate and the exterior radial surface of a roller, it is desireable to orient permanent magnets embedded within the exterior radial surface of the roller so that they create a multiplicity of zones of high magnetic flux density. A known method of doing so utilizes a plurality of substantially rectangular oblong magnet receiving channels milled into the exterior radial surface of the roller, the longitudinal midlines of the channels being parallel with the axis of rotation of the roller. Within each channel, a multiplicity of permanent magnets are fixedly mounted and aligned so that their polar axes are parallel with the longitudinal midlines of the channels. The magnets are arranged so that their poles are in a NN-SS-NN-SS-NN configuration, and magnetically soft steel pole pieces are interspaced between each of the magnets. The alternating pole configuration of the series of magnets causes magnetic induction to occur within the pole pieces, resulting in heightened concentrations of lines of magnetic flux emanating from and entering into the outer walls of the pole pieces. The depth of the magnet receiving channels within the roller, the height and curvature of the permanent magnets, and height and curvature of the pole pieces are fitted so that the outer walls of the magnets and the pole pieces form smooth continuations of the exterior radial surface of the roller.

Such a configuration of magnet receiving channels, magnets and pole pieces results in a multiplicity of zones of high concentration of magnetic flux lines on the exterior radial surface of the roller. When such a steel printing or die cutting plate is wrapped over the exterior radial surface of such a roller, each magnet embedded within the roller is armatured; each armature consisting of a north pole piece in contact with the magnet's north pole, a south pole piece in contact with the magnet's south pole; and the ferromagnetic printing or die cutting plate contacting and spanning between the north and south pole pieces. Allowing the plate to act as an armaturing link between the north and south poles of each magnet results in a strong magnetic bond between the plate and the roller.

A channeled roller such as is described above preferably is composed of a highly durable material such as steel. However, ordinary steel is ferromagnetic. If the above described magnet and pole piece series were to be installed directly into a channel milled into a magnetic steel roller, the roller itself would serve as an armaturing link between the pole pieces. Magnetic flux density within a magnetic armature is proportional to the cross sectional area of the armature. Allowing an underlying steel roller to act as an additional armaturing link increases the cross-sectional area of the armature, decreasing flux density within the overlying printing or die cutting plate. Thus, use of a magnetic steel channeled roller may cause the attractive force between the roller and the plate to be unacceptably low. A known method of solving this problem is to form the roller by milling channels into a non-magnetic stainless steel roll. Non-magnetic stainless steel contacting the north and south pole pieces will not act as an armaturing link between the poles. However, utilization of stainless steel as the roller substrate material is undesirable because stainless steel is much more expensive than common magnetic steel.

The instant inventive magnetic roller provides the dual benefits of strength and economy of magnetic steel rollers, while preserving an armaturing path passing primarily through the steel print or die cutting plate. Such benefits are achieved by providing non-magnetic spacers mounted between the magnet/pole piece series and an underlying channeled roller composed of magnetic steel.

PRIOR ART PATENTS

U.S. Pat. No. 4,640,808 issued Feb. 3, 1987, to Okumura, et al., discloses a method for making magnetic rolls.

U.S. Pat. No. 4,823,697 issued Apr. 25, 1989, to Randazzo discloses a magnetic plate cylinder.

U.S. Pat. No. 3,721,189 issued Mar. 20, 1973, to Bray discloses a magnetic print cylinder.

U.S. Pat. No. 5,370,050 issued Dec. 6, 1994, to Reffert discloses a printing cylinder and endless sleeve.

U.S. Pat. No. 5,392,702 issued Feb. 28, 1995, to Suzuki discloses a magnetic rolling system having rollers with laminated ply units disposed therein.

U.S. Pat. No. 4,852,490 issued Aug. 1, 1989, to McEachern discloses a magnetic cylinder having rigid support for a magnetic cover.

U.S. Pat. No. 4,831,930 issued May 23, 1989, to Leanna discloses a magnetic cylinder.

U.S. Pat. No. 4,823,102 issued Apr. 18, 1989, to Cherian, et al., discloses a magnetic roll for a copier.

U.S. Pat. No. 4,676,161 issued Jun. 30, 1987, to Peekna discloses a magnetic cylinder with image plate or blanket for offset printing.

U.S. Pat. No. 4,625,928 issued Dec. 2, 1986, to Peekna discloses a method of assembly of magnetic cylinders.

None of the above disclosed patents teaches, discloses or describes the novel, inventive, useful, and unique aspects and features of the present invention.

BRIEF SUMMARY OF THE INVENTION

The instant inventive magnetic roller comprises an elongated cylinder having a circular lateral cross-section. The cylinder has an axially aligned axle channel or journaled ends for rotatable mounting of the roller within a roller press machine. The cylinder is composed of magnetically soft steel. Within the exterior radial surface of the cylinder are milled a plurality of spacer receiving channels, each spacer receiving channel preferably having rectangular oblong side walls and floor. The side walls and floors of the spacer receiving channels preferably extend along the exterior radial surface of the cylinder, parallel to the cylinder's axis of rotation. Fixedly attached within each spacer receiving channel is a non-magnetic spacer, each such spacer having an elongated "C" channel shape forming a magnet receiving channel. The exterior surfaces of the non-magnetic spacers are closely fitted for mounting within the spacer receiving channels of the roller. Preferably, the non-magnetic spacers are composed of non-magnetic stainless steel. However, other durable non-magnetic materials may be utilized.

Fixedly attached within the interior channel of each non-magnetic spacer is an alternating series of permanent magnets and magnetically soft steel pole pieces. Preferably, the polar axes of the permanent magnets are in parallel alignment with the longitudinal midlines of the channels. Also, preferably, the poles of the permanent magnets are arranged in an alternating NN-SS-NN-SS configuration, with magnetically soft steel pole pieces separating each magnet from the next succeeding and preceding magnet. Preferably, the permanent magnets and the pole pieces are substantially rectangular in shape, fitting within the substantially rectangular cross sections of the magnet receiving channels. Also, preferably, the outwardly facing surfaces of the magnets and pole pieces are outwardly curved, forming a smooth radial roller surface.

The non-magnetic spacers which are in contact with three side walls of each pole piece do not serve as armaturing links between the north and south poles of the magnets because the spacers are non-magnetic. The underlying magnetic steel roller remains an armaturing link between the poles; however, its armaturing effect is rendered insignificant by the zones of high magnetic reluctance created by the non-magnetic spacers. Thus, through use of non-magnetic spacers "insulating" a magnetic steel roller dual benefits of economy and strength may be obtained.

Accordingly, it is an object of the present invention to provide a magnetic roller for channeled support of magnets in an NN-SS-NN-SS series, the roller providing the dual benefits of strength and economy through utilization of a magnetically soft mild steel channeled roller in combination with non-magnetic spacers.

Other and further objects, benefits, and advantages of the present invention will become known to those skilled in the art upon review of the Detailed Description which follows, and upon review of the appended drawings.

DETAILED DESCRIPTION OF THE PREFERRED EMBODIMENT

Figure 1:
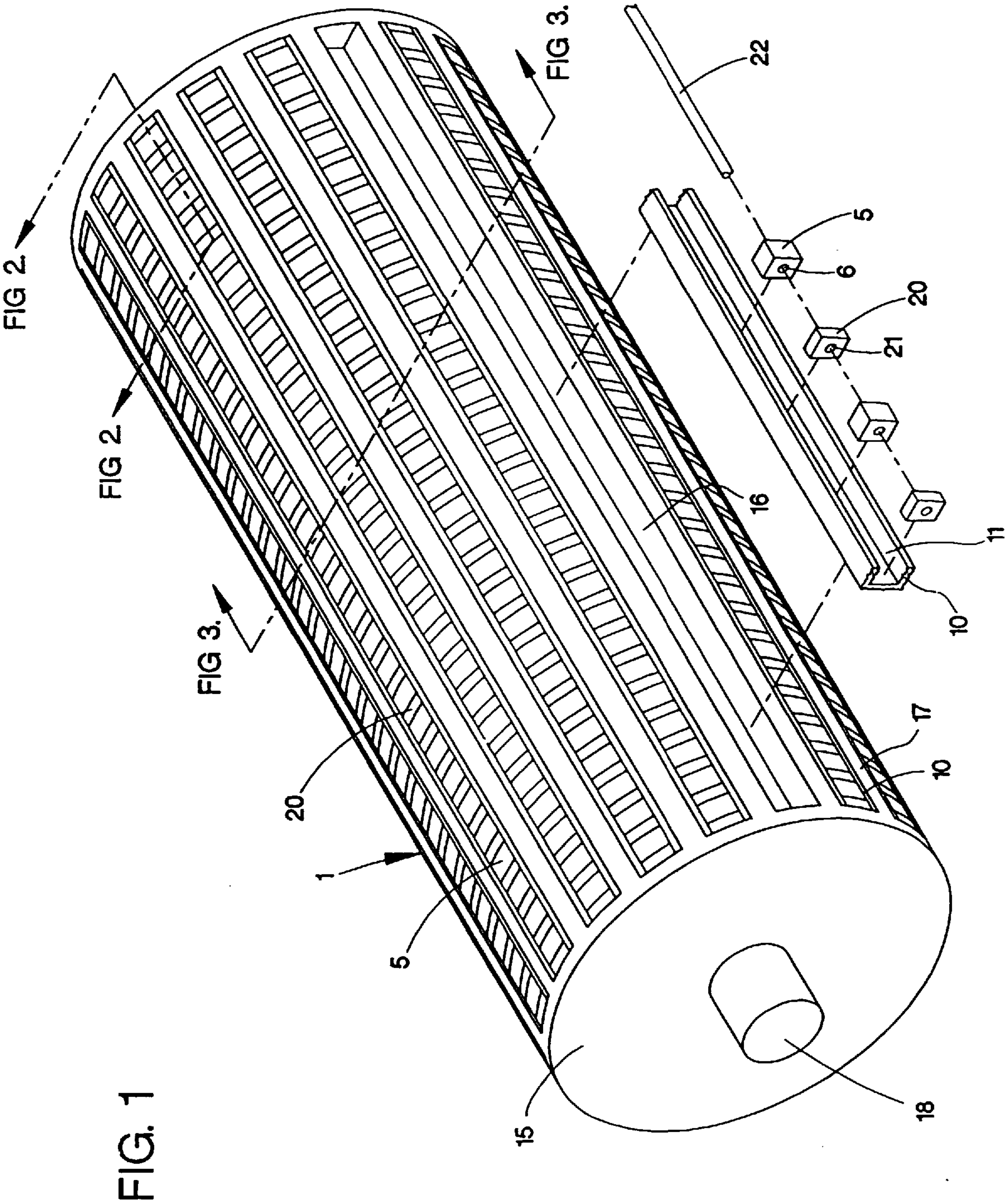
FIG. 1 is an isometric view of the magnetic roller, showing a spacer and a series of magnets and pole pieces in exploded view.

Referring now to the drawings, and in particular to FIG. 1, the magnetic roller 1 is shown in an isometric view. The cylindrical body 15 of the magnetic roller 1 has a plurality of spacer receiving channels 16 milled into its outer radial surface. The magnetic roller 1 as portrayed has twenty spacer receiving channels 16. The number of spacer receiving channels may be increased or decreased depending upon the diameter of the roller and the dimensions of magnets installed within the channels 16. Each spacer receiving channel 16 is substantially rectangular, having an oblong floor and side walls extending substantially the full length of the magnetic roller 1, the channels 16 being substantially parallel with the axis of rotation of the magnetic roller 1. Wall flanges 17 formed by milling the spacer receiving channels 16 into the cylindrical body 15 provide strong structural support for magnets installed within the channels 16. Preferably, the cylindrical body 15 of the magnetic roller 1 is composed of economically obtained magnetically soft steel. The ends of the cylindrical body 15 of the magnetic roller 1 have, as portrayed, outwardly extending journals 18 for rotatable mounting of the roller 1 within a high speed roller press machine. Alternately, the roller may have an axle receiving channel extending along its axis of rotation.

Referring further to FIG. 1, within each spacer receiving channel 16 is fixedly mounted a non-magnetic spacer 10, each non-magnetic spacer 10 having a "C" channel configuration, and having its exterior surface fitted for mounting within the spacer receiving channels 16. The spacers preferably are composed of annealed austenitic stainless steel, which typically is non-magnetic. The interior space of each non-magnetic spacer 10 forms a magnet receiving channel 11 which also is substantially rectangular in shape. A preferable attaching means for mounting the non-magnetic spacers 10 within the spacer receiving channels 16 of the cylindrical body 15 is an epoxy-based adhesive. Alternately, the non-magnetic spacers 10 may be installed by machine screws extending through the floor of the spacer and into the cylindrical body 15. Such machine screws preferably are composed of non-magnetic stainless steel. Though the non-magnetic spacers 10 are preferably composed of non-magnetic stainless steel because of its strength, other durable non-magnetic materials may be utilized including brass, aluminum, copper, high impact plastic, and fiberglass.

Figure 2:
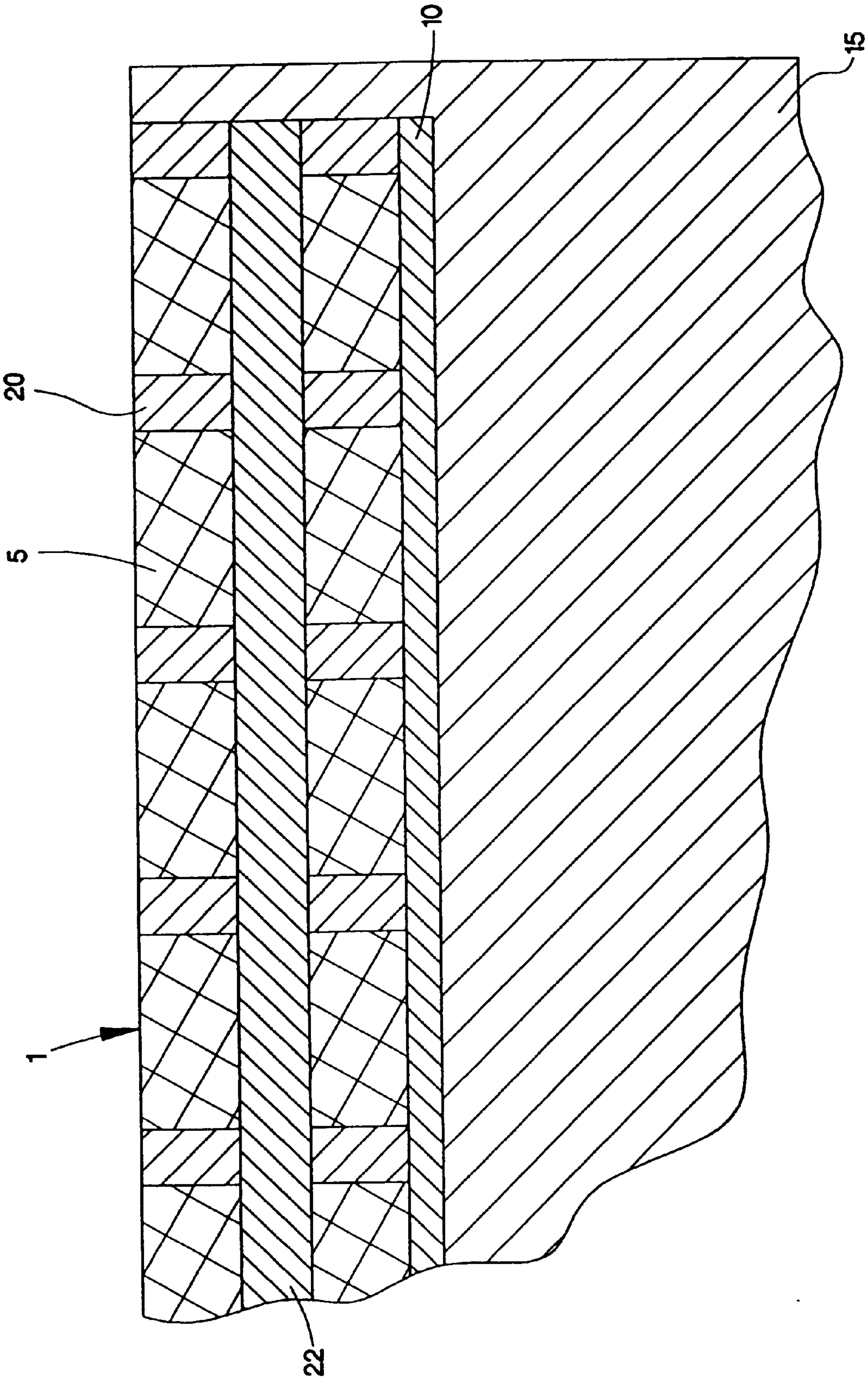
FIG. 2 is a sectional view of a portion of the magnetic roller, the plane of the section including the axis of rotation of the roller, and passing through a series of magnets and pole pieces.
Figure 3:
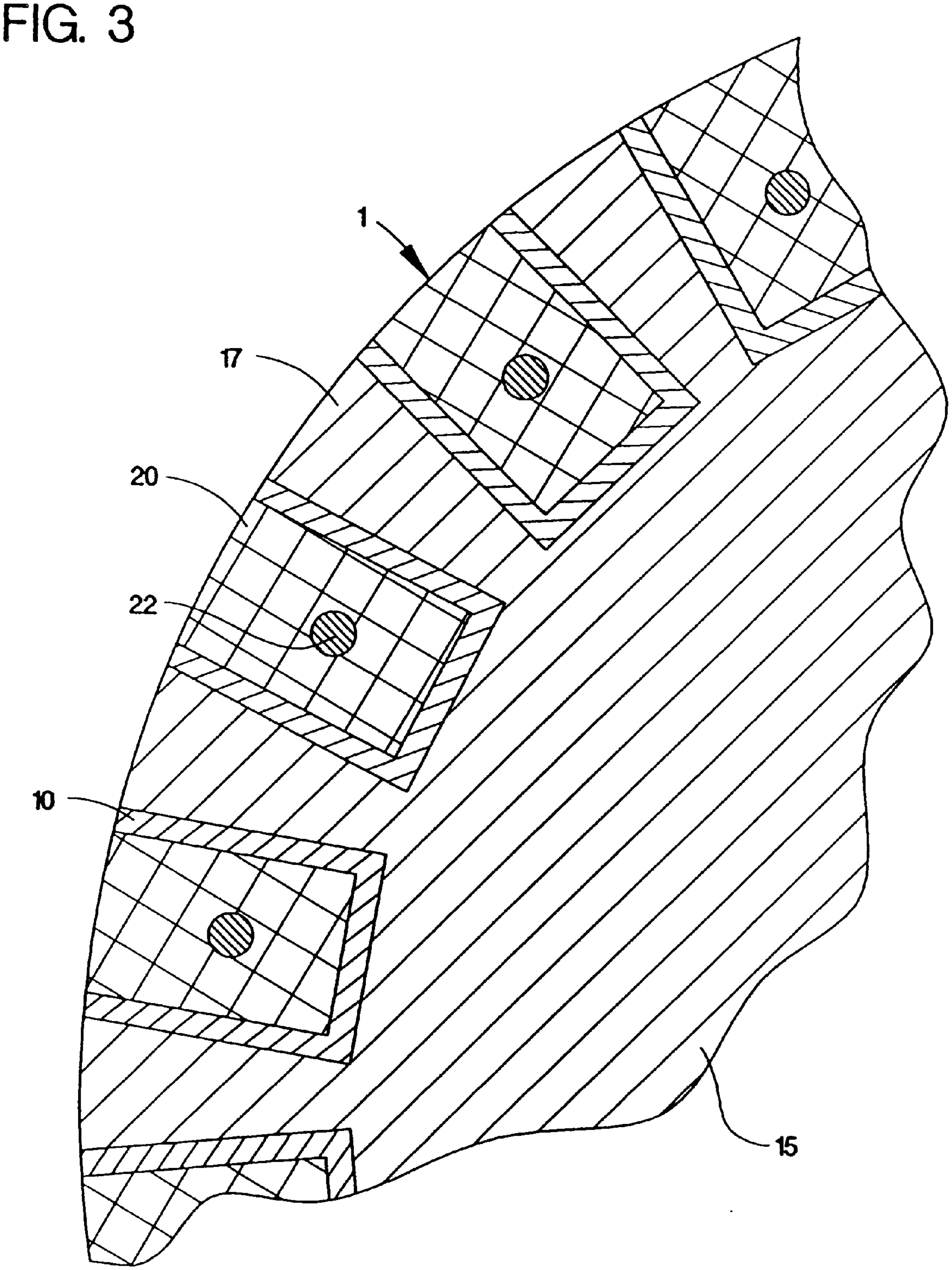
FIG. 3 is a partial sectional view of the magnetic roller, the plane of the section passing perpendicularly through the axis of rotation of the roller.

Referring further to FIG. 1, fixedly mounted within the magnet receiving channel 11 of each non-magnetic spacer 10 is a series of permanent magnets 5 and magnetically soft steel pole pieces 20. Preferably, the permanent magnets are composed of neodymium iron boron, samarium cobalt, a ferric oxide ceramic, or an alloy of aluminum, nickel, cobalt and iron, commonly known as "alnico." Each permanent magnet 5 is a substantially rectangular bar magnet having its polar axis aligned with the longitudinal midline of the magnet receiving channel 11. Preferably, the permanent magnets 5 and the pole pieces 20 are fixedly mounted within the magnet receiving channels 11 by means of an epoxy-based adhesive. Each pole piece 20 and each permanent magnet 5 has an installation aperture, 21 and 6 respectively, extending therethrough along its longitudinal midline. The installation apertures 21 and 6 allow the pole pieces 20 and permanent magnets 5 to be strung in series over an installation rod 22 for assistance in installation within the magnet receiving channels 11. Referring simultaneously to FIGS. 1 and 2, the installation apertures 6 and 21 extend longitudinally through the permanent magnets 5 and pole pieces 20 forming a continuous rod receiving channel through the magnets 5 and pole pieces 20. The installation rods 22 remain permanently embedded within and through the magnets 5 and pole pieces 20. The rods 22, so embedded, provide additional structural integrity, holding magnets 5 and pole pieces 20 in place in the event the adhesive fails.

Figure 4:
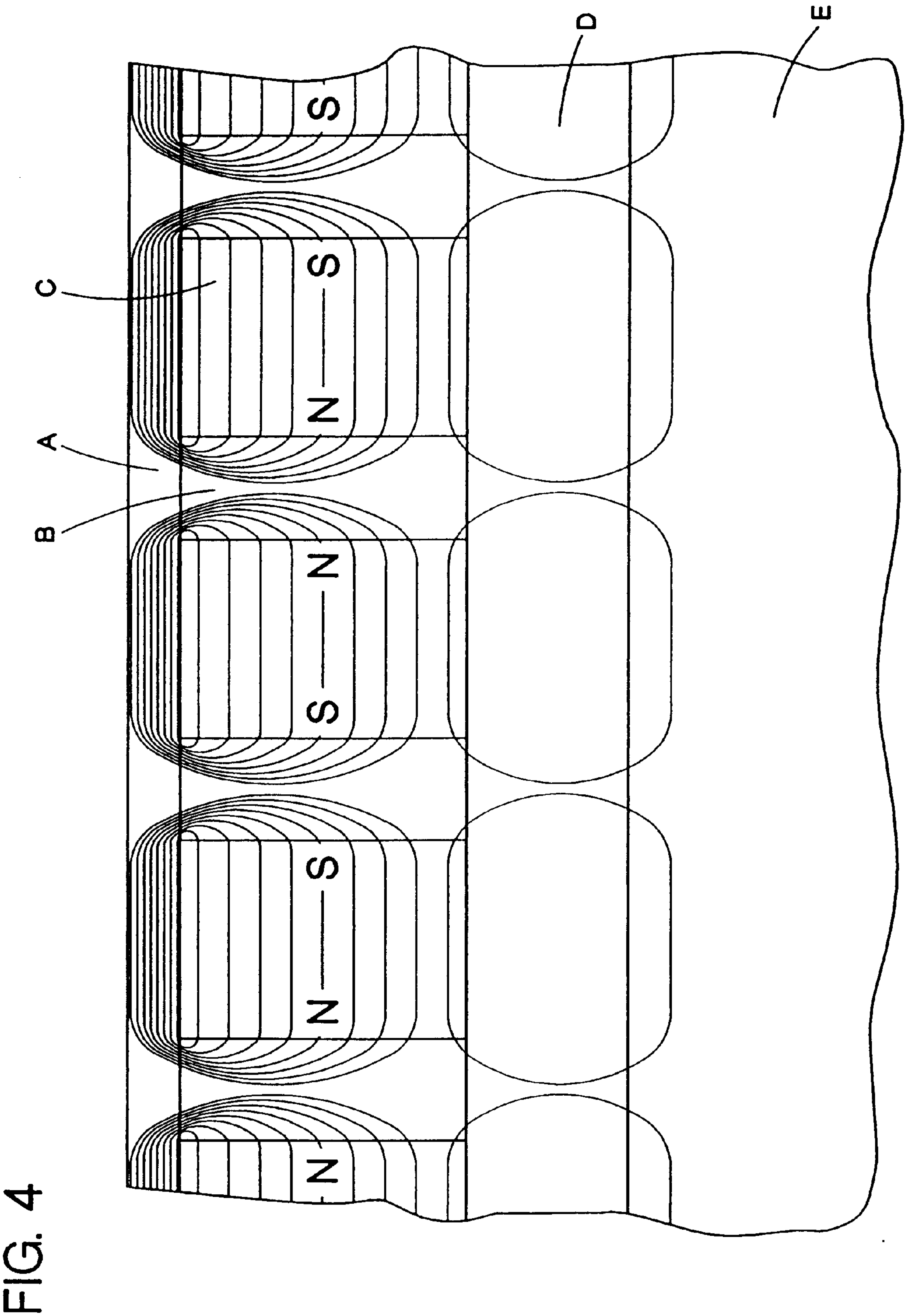
FIG. 4 is a flux path diagram showing a substrate zone, spacer zone, and pole piece and pole orientation of magnets.

Referring simultaneously to FIGS. 1 and 4, FIG. 4 is a representational sectional view of the magnet, pole piece, spacer, and cylinder body configuration depicted in FIG. 1. Zone A represents a ferromagnetic printing or die cutting plate overlying the exterior radial surface of the roller 1; Zones B represent the pole pieces 20; Zones C represent the permanent magnets 5; Zone D represents a non-magnetic spacer 10, and Zone E represents the ferromagnetic steel roller 15. Since the material in Zones A and B are ferromagnetic steel, Zones A and B form a series of "C" shaped armatures extending from the north pole of each magnet to its south pole. The armaturing effect of Zones A and C concentrates lines of magnetic flux at the junctures of the pole pieces and the overlying plate, enhancing the attractive force between the roller and the plate. Since Zone D is composed of non-magnetic stainless steel, its reluctance is equivalent to that of an air gap; approximately 1000 times the reluctance of the overlying ferromagnetic printing or die cutting plate. The high reluctance of Zone D isolates the ferromagnetic material in Zone E, preventing the creation of an additional armaturing link between the pole pieces in Zones B. The presence of the non-magnetic Zone D, isolating Zone E, allows the primary armature to extend through Zone A, enhancing the strength of the magnetic field through Zone A, and increasing magnetic attraction to that point.

Figure 5:
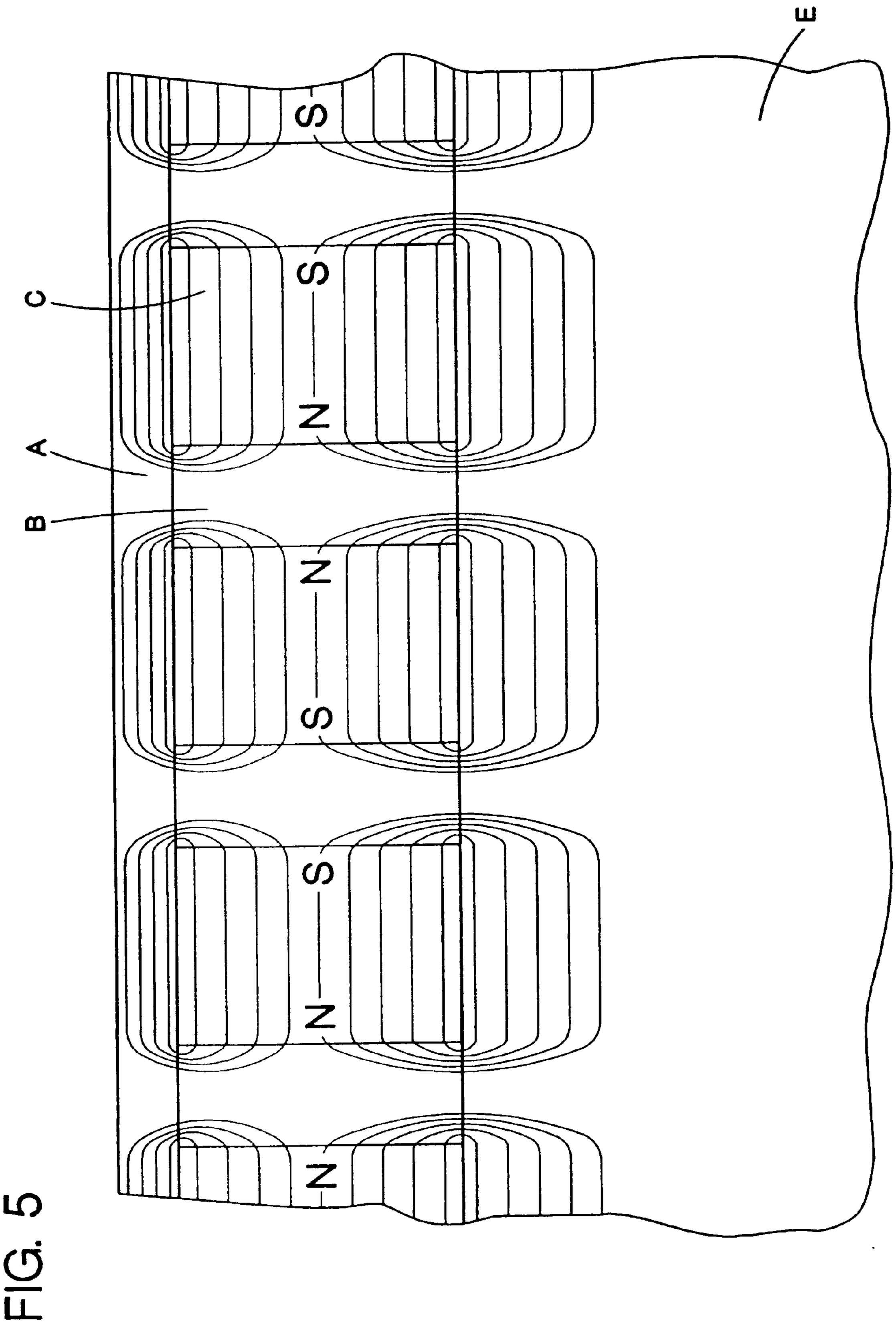
FIG. 5 is a second flux path diagram with spacer zone removed.

FIG. 5 is structurally identical to FIG. 4, except the non-magnetic spacer of Zone D is removed. Without Zone D, both Zones A and E serve as armaturing links between the poles of the magnets. As shown by FIG. 5, flux generated by the magnets travels in a dual path, outwardly through the printing or die cutting plate, and inwardly through the roller. Since much of the magnetic flux passes through the roller instead of the plate, attractive force between the plate and the roller is diminished. Thus, referring to FIG. 4, it is desireable to interpose non-magnetic material (Zone D) between the magnets and pole pieces and the underlying roller.

Referring to FIG. 5, if Zone E is composed of a non-magnetic material such as stainless steel, the sole armature path will extend through the overlying Zone A. However, stainless steel is much more expensive than common magnetic steel. The present inventive roller which combines non-magnetic spacers with a magnetic channeled roller allows the dual benefits of high strength and cost economy to be obtained.

While the principles of the invention have been made clear in the above illustrative embodiment, those skilled in the art may make modifications in the structure, arrangement, and components of the invention without departing from those principles. Accordingly, it is intended that the description and drawings be interpreted as illustrative and not in the limiting sense, and that the invention be given a scope commensurate with the appended claims.

I claim:

1. A magnetic roller comprising:

(a) a roller having an exterior radial surface, a first end, a second end, an axis of rotation extending from the first end to the second end, and having a plurality of outwardly opening spacer receiving channels therearound, each such channel having a floor, a pair of side walls and a longitudinal midline, and each such channel extending inwardly from said exterior radial surface, the roller being composed of a material comprising ferromagnetic steel;

(b) a plurality of non-magnetic spacers, each such spacer having an exterior surface and an interior surface, each such spacer's exterior surface being sized and fitted for fixed mounting within one of the spacer receiving channels of the roller, each such spacer's interior surface forming a magnet receiving channel, each such magnet receiving channel having a floor, a pair of side walls, and a longitudinal midline; each such spacer being composed of a material comprising a non-magnetic material;

(c) a multiplicity of permanent magnets, each having a north end, a south end, a polar axis extending from the north end to the south end, and each having a plurality of side walls extending from the north end to the south end, each such magnet's side walls being sized and positioned so that each such magnet may be fixedly mounted within the magnet receiving channel of one of the non-magnetic spacers; and, (d) a multiplicity of pole pieces, each pole piece having a first end, a second end and a plurality of side walls extending from the first end to the second end, each such pole piece's side walls being sized and positioned so that each such pole piece may be fixedly mounted within the magnet receiving channel of one of the non-magnetic spacers; each such pole piece being composed of a material comprising magnetically soft steel; each non-magnetic spacer being fixedly mounted within a spacer receiving channel of the magnetic roller and oriented therein so that the magnet receiving channel of each non-magnetic spacer opens outwardly; and the permanent magnets and pole pieces being fixedly mounted within the magnet receiving channels of the non-magnetic spacers so that they are stacked end to end, so that a multiplicity of the pole pieces are alternately interspaced between the permanent magnets, and so that a multiplicity of the permanent magnets have their north and south ends alternately oriented.

2. The magnetic roller of claim 1, wherein the magnet receiving channel of each non-magnetic spacer is substantially rectangular, the floor and side walls of each magnet receiving channel being substantially parallel with the axis of rotation of the roller; and wherein the material composing each non-magnetic spacer comprises a material selected from the group of non-magnetic stainless steel, copper, brass, aluminum, plastic, or fiberglass.

3. The magnetic roller of claim 2, wherein the permanent magnets are composed of a material selected from the group of neodymium iron boron, samarium cobalt, a ferric oxide ceramic, or an aluminum, nickel, cobalt and iron alloy.

4. The magnetic roller of claim 3, wherein an adhesive fixedly mounts the non-magnetic spacers within the spacer receiving channels of the roller.

5. The magnetic roller of claim 3, wherein non-magnetic machine screws fixedly mount the non-magnetic spacers within the spacer receiving channels of the roller.

6. The magnetic roller of claim 4, wherein an adhesive fixedly mounts the permanent magnets and pole pieces within the magnet receiving channels of the non-magnetic spacers.

7. The magnetic roller of claim 5, wherein an adhesive fixedly mounts the permanent magnets and pole pieces within the magnet receiving channels of the non-magnetic spacers.

8. The magnetic roller of claim 6, wherein the ends of the roller are journaled for rotatable mounting within a roller press machine.

9. The magnetic roller of claim 7, wherein the ends of the roller are journaled for rotatable mounting within a roller press machine.

10. Magnetic roller of claim 6, further having an axle receiving channel extending along the axis of rotation of the roller for rotatable mounting of the magnetic roller within a roller press machine.

11. Magnetic roller of claim 7, further having an axle receiving channel extending along the axis of rotation of the roller for rotatable mounting of the magnetic roller within a roller press machine.

* * * * *